T. N. MACHIN.
ELASTIC-CLEVIS.
No. 175,572.    Patented April 4, 1876.
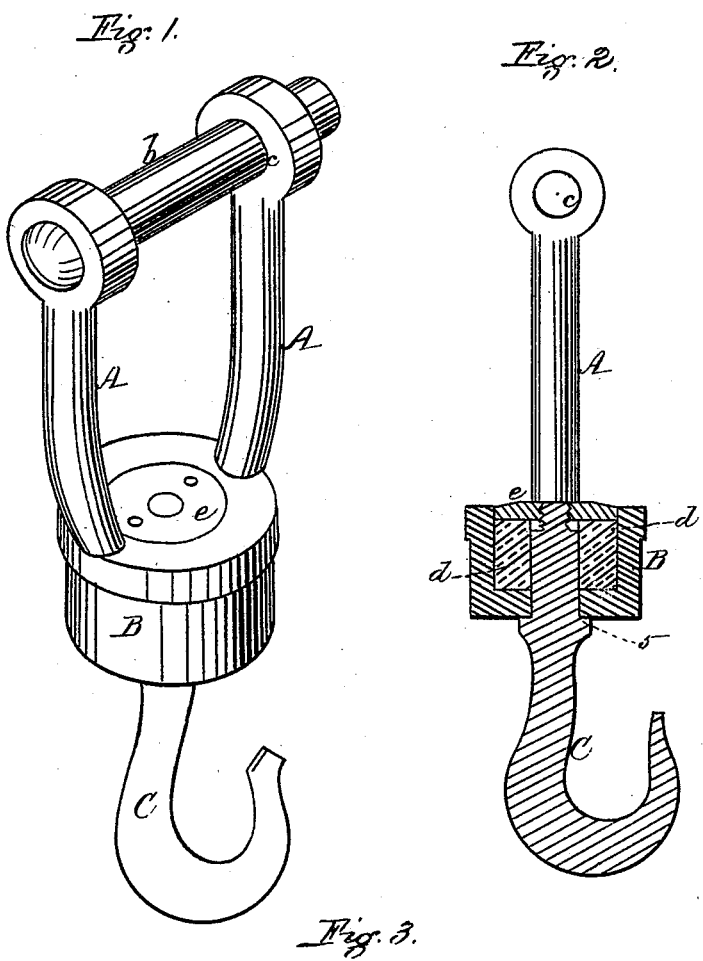
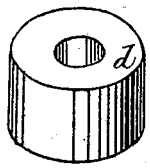

UNITED STATES PATENT OFFICE

TIMOTHY N. MACHIN, OF WAYLAND, MASSACHUSETTS.

IMPROVEMENT IN ELASTIC CLEVISES.

Specification forming part of Letters Patent No. 175,572, dated April 4, 1876; application filed January 31, 1876.

*To all whom it may concern:*

Be it known that I, TIMOTHY N. MACHIN, of Wayland, in the county of Middlesex and State of Massachusetts, have invented an Elastic Clevis, of which the following is a full, clear, and exact description, reference being had to the accompanying drawings, making part of this specification, in which—

Figure 1 is a perspective view of my improved clevis. Fig. 2 is a section through the center of the same. Fig. 3 is a view of the spring detached.

The ordinary draft-iron known as a "clevis" is rigid and unyielding, and, in starting a load, the horse or other animal is liable to be brought up with a sudden jar or concussion, which often causes pain or discomfort to the animal, so that he is unwilling to make further effort; and, furthermore, in plowing, &c., the sudden jar caused by striking a rock or other obstruction often results in the breaking of the implement or some portion of the harness.

Elastic clevises have heretofore been made of various descriptions to overcome these difficulties; and my invention relates to this class of elastic clevises, and consists of details of construction, as hereinafter more fully set forth and claimed.

To enable others skilled in the art to understand and use my invention, I will proceed to describe the manner in which I have carried it out.

In the said drawings, A represents the bow of the clevis, which is intended to be secured to the whiffletree by a bolt, $b$, passing through eyes $c$, in the usual manner. At the end of the bow A is a cylindrical head, B, which is made hollow for the reception of a cylindrical block, $d$, of vulcanized rubber, which forms a stiff spring, through an aperture in the center of which extends the shank of the hook C, over the end of which is screwed or riveted a circular nut or plate, $e$, which fits into the mouth of the recess or chamber which contains the spring $d$, and rests thereon, the shank of the hook being provided with a shoulder, 5, which bears against the outer surface of the head B, and thus, when the draft is is applied to the clevis, the spring $d$ is compressed within its chamber in the head B by the plate $e$, allowing the hook C to yield in the direction of its length, whereby the sudden jar or concussion heretofore experienced in starting a load, where an ordinary clevis is employed, is entirely avoided, and consequently there is no liability of the horse or other animal being hurt or injured from this cause, as is frequently the case with a rigid and unyielding clevis.

It will be seen that the spring $d$ is inclosed and protected on all sides within its chamber in the head B, which renders it capable of resisting an immense strain without injury, and prevents it from being worn or deteriorated by constant use.

If desired, a metallic spring of suitable form may be employed instead of the rubber spring $d$.

My elastic clevis may be used to great advantage in plowing, &c., as it avoids the liability of the implement or some portion of the harness being broken by a sudden jar or concussion produced by striking a rock or other obstruction, which is an event of frequent occurrence, and often occasions much damage.

The above-described clevis is simple, durable, and inexpensive, and may be employed wherever it can be used to advantage—for instance, in hoisting heavy articles, where it is desired to avoid a sudden shock to machinery.

What I claim as my invention, and desire to secure by Letters Patent, is—

The hollow head B, provided with the yoke A $b$, in combination with the inclosed spring $d$, sliding hook C, and plate $e$, operating substantially as described, and for the purpose set forth.

Witness my hand this 26th day of January, A. D. 1876.

TIMOTHY N. MACHIN.

Witnesses:
P. E. TESCHEMACHER,
W. J. CAMBRIDGE.